(12) United States Patent
Brekke et al.

(10) Patent No.: US 9,207,068 B2
(45) Date of Patent: Dec. 8, 2015

(54) DISPLACEMENT SENSOR, IN PARTICULAR FOR USE IN A SUBSEA DEVICE

(71) Applicant: Siemens Aktiengesellschaft, Munich (DE)

(72) Inventors: Endre Brekke, Trondheim (NO);
Hessam Moussavinik, Trondheim (NO);
Kjetil Zsolt Volent, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 180 days.

(21) Appl. No.: 13/970,422

(22) Filed: Aug. 19, 2013

(65) Prior Publication Data

US 2014/0048163 A1   Feb. 20, 2014

(30) Foreign Application Priority Data

Aug. 17, 2012 (EP) .................................. 12180889

(51) Int. Cl.
| | | |
|---|---|---|
| *G02B 6/00* | (2006.01) | |
| *G01B 11/14* | (2006.01) | |
| *F16L 55/04* | (2006.01) | |
| *G01B 9/02* | (2006.01) | |
| *G01L 9/00* | (2006.01) | |
| *G01D 5/353* | (2006.01) | |
| *G01D 5/04* | (2006.01) | |
| *G01D 5/26* | (2006.01) | |

(52) U.S. Cl.
CPC ................ *G01B 11/14* (2013.01); *F16L 55/04* (2013.01); *G01B 9/02* (2013.01); *G01D 5/35316* (2013.01); *G01L 9/0076* (2013.01); *G01D 5/04* (2013.01); *G01D 5/268* (2013.01)

(58) Field of Classification Search
CPC .......... G01B 11/14; G01B 9/02; G01D 5/353; G01D 5/35316; G01L 7/16; G01L 9/0076; H05K 5/06
See application file for complete search history.

(56) References Cited

U.S. PATENT DOCUMENTS

| | | | |
|---|---|---|---|
| 7,009,707 B2 * | 3/2006 | Beresford et al. | ............ 356/478 |
| 7,974,503 B2 * | 7/2011 | Huang et al. | .................... 385/13 |
| 2002/0174728 A1 * | 11/2002 | Beresford et al. | ............. 73/861 |
| 2009/0180730 A1 * | 7/2009 | Foster et al. | ..................... 385/13 |
| 2009/0297089 A1 | 12/2009 | Huang | ............................ 385/12 |

(Continued)

FOREIGN PATENT DOCUMENTS

| | | |
|---|---|---|
| CN | 101625230 A | 1/2010 |
| CN | 202074949 U | 12/2011 |

(Continued)

OTHER PUBLICATIONS

European Search Report, Application No. 12180901.6, 6 pages, Jan. 28, 2013.
European Search Report, Application No. 12180889.3, 7 pages, Feb. 8, 2013.

*Primary Examiner* — Rhonda Peace
(74) *Attorney, Agent, or Firm* — Slayden Grubert Beard PLLC

(57) ABSTRACT

A displacement sensor for sensing the displacement of a movable component is provided. The displacement sensor includes a displacement transmission mechanism configured to reduce a large displacement provided at its input into a smaller displacement at its output. The displacement sensor further includes a fiber optic displacement sensor, wherein the output of the displacement transmission mechanism is coupled to the fiber optic displacement sensor.

19 Claims, 2 Drawing Sheets

(56) References Cited

U.S. PATENT DOCUMENTS

| | | | |
|---|---|---|---|
| 2011/0203379 A1* | 8/2011 | Virtanen et al. | 73/708 |
| 2012/0247213 A1* | 10/2012 | Zumberge et al. | 73/653 |
| 2014/0047925 A1* | 2/2014 | Brekke et al. | 73/774 |
| 2014/0048163 A1* | 2/2014 | Brekke et al. | 138/30 |
| 2014/0112094 A1* | 4/2014 | Fernihough | 367/7 |

FOREIGN PATENT DOCUMENTS

| | | |
|---|---|---|
| EP | 2169690 A1 | 3/2010 |
| GB | 2221534 A | 2/1990 |
| KR | 20110037314 A | 4/2011 |
| KR | 101057309 B1 | 8/2011 |

\* cited by examiner

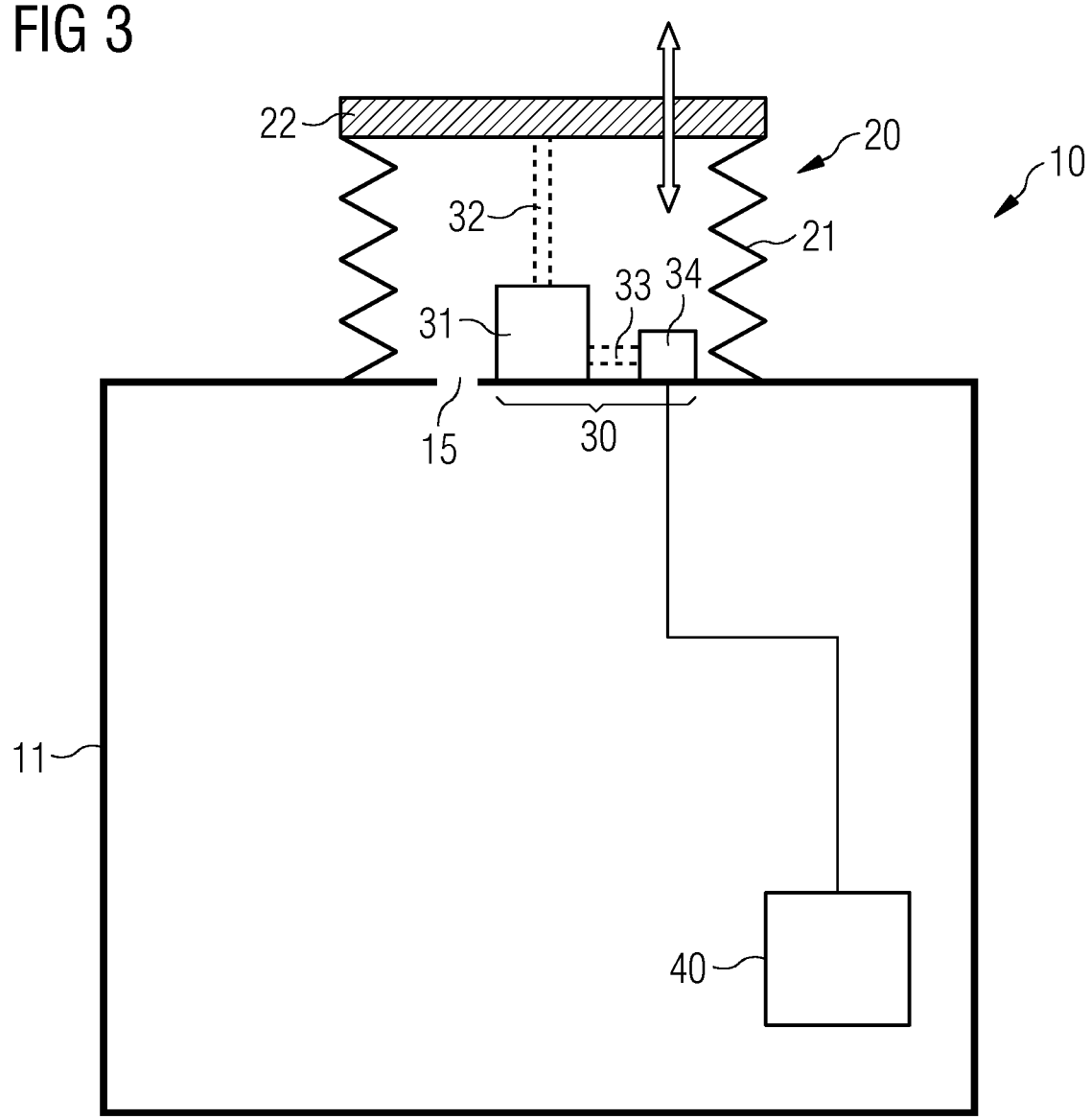

DISPLACEMENT SENSOR, IN PARTICULAR FOR USE IN A SUBSEA DEVICE

CROSS-REFERENCE TO RELATED APPLICATIONS

This application claims priority to EP Patent Application No. 12180889 filed Aug. 17, 2012. The contents of which is incorporated herein by reference in its entirety.

TECHNICAL FIELD

This disclosure relates to a displacement sensor for sensing the displacement of a movable component of a device, in particular a subsea device. The disclosure further relates to a method of sensing the displacement of a movable component of a device.

BACKGROUND

Oil platforms are often used in offshore oil and gas production. More recently, processing facilities are being relocated to the ocean floor. Such subsea installations may be located in considerable water depths, for example in a depth of more than 1.000, 2.000 or even more than 3.000 meters. At such water depths, corresponding pressures of about 100, 200 or 300 bar, respectively, prevail. The devices forming part of such subsea installation do accordingly need to be capable of handling such high ambient pressures.

One possibility of handling high pressures is the use of a pressure resistant enclosure which maintains a close to atmospheric pressure inside, thus enabling the use of standard topside components. A further possibility is the use of a pressure compensated enclosure. Such enclosure generally comprises a pressure compensation system, or pressure compensator, which balances the pressure inside the enclosure to the pressure prevailing in the ambient seawater. Due to the large volume changes experienced by gases when increasing the pressure, the pressure compensated enclosure is generally filled with a dielectric liquid, thus keeping the volume changes which the liquid experiences and which the pressure compensator needs to compensate relatively low.

When using such pressure compensated enclosure, it is desirable to know which status the pressure compensator has at any point in time and whether the pressure compensator operates correctly. In conventional subsea devices, only pressure sensors are available for determining the pressure inside the subsea device, which may indicate the functioning of the pressure compensator. A particular problem is that due to the pressure and temperature differences between the topside and the ocean floor, relatively large volume differences can occur, resulting in large movements of the pressure compensator. Large movements are difficult to measure with high precision, and furthermore, the available sensors are generally not operable in the environment prevailing inside a pressure compensated subsea device, i.e. within a dielectric liquid at high pressures. It is thus desirable to measure relatively large displacements with high accuracy in such difficult environment.

SUMMARY

One embodiment provides a displacement sensor for sensing the displacement of a movable component of a device, comprising a displacement transmission mechanism adapted to reduce a larger displacement provided at its input into a smaller displacement at its output, wherein the input of the displacement transmission mechanism is coupled to the movable component of the device, and a fiber optic displacement sensor, wherein the output of the displacement transmission mechanism is coupled to the fiber optic displacement sensor.

In a further embodiment, the fiber optic displacement sensor comprises one of a fibre Bragg grating sensor or an interferometric sensor.

In a further embodiment, the fiber optic displacement sensor is mounted to an enclosure of the device, preferably to an inner face of a wall of a pressure compensator forming part of the device.

In a further embodiment, the displacement transmission mechanism comprises a gearbox, the displacement transmission mechanism employing a gear reduction to reduce the displacement.

In a further embodiment, the displacement transmission mechanism comprises a toothed rack.

In a further embodiment, the toothed rack is attached to the movable component of the device, wherein the gearbox comprises a gearwheel engaged with the toothed rack.

In a further embodiment, the displacement transmission mechanism comprises a toothed rack which engages a gear of the displacement transmission mechanism and which is attached to the fiber optic displacement sensor.

In a further embodiment, the device is a subsea device and comprises a pressure compensator having an internal volume, the movable component being movable to change the internal volume of the pressure compensator.

In a further embodiment, the pressure compensator comprises at least one bellow having a lid which forms the movable component and which is movable to change the internal volume of the bellow, the input of the displacement transmission mechanism being mounted to the lid.

In a further embodiment, the pressure compensator comprises at least one cylinder having a lid which forms the movable component and which is movable to change the internal volume of the cylinder, the input of the displacement transmission mechanism being mounted to the lid.

In a further embodiment, the input of the displacement transmission mechanism comprises a toothed rack mounted to the lid and extending in a direction perpendicular to the lid, preferably towards the internal volume of the pressure compensator.

In a further embodiment, the device is a subsea device and the displacement sensor is mounted inside a housing of the subsea device, preferably inside a pressure compensator forming part of the subsea device, wherein the housing is filled with a dielectric liquid and is pressure balanced to an ambient pressure.

Another embodiment provides a pressure compensator for a subsea device comprising a displacement sensor as disclosed above, wherein the movable component forms part of the pressure compensator and is movable to change an internal volume of the pressure compensator, wherein the displacement sensor is adapted to detect changes of the internal volume of the pressure compensator by detecting a displacement of the movable component.

In a further embodiment, the movable component is a lid of a bellow or cylinder of the pressure compensator, the input of the displacement transmission mechanism being mounted to the lid.

Another embodiment provides a method of sensing the displacement of a movable component of a device, e.g., of a pressure compensator of a subsea device, comprising the steps of providing a displacement transmission mechanism adapted to reduce a larger displacement provided at its input into a smaller displacement at its output, wherein the input of the displacement transmission mechanism is coupled to the movable component of the device, providing a fiber optic displacement sensor, wherein the output of the displacement transmission mechanism is coupled to the fiber optic displacement sensor, reducing a larger displacement of the movable component of the device to a smaller displacement, and detecting the smaller displacement using the fiber optic displacement sensor.

BRIEF DESCRIPTION OF THE DRAWINGS

Example embodiments are discussed in detail below with reference to the drawings, in which:

FIG. 3 is a schematic diagram showing an example subsea device comprising an example pressure compensator, wherein a displacement sensor according to one embodiment is arranged inside the pressure compensator.

DETAILED DESCRIPTION

Figure 1:
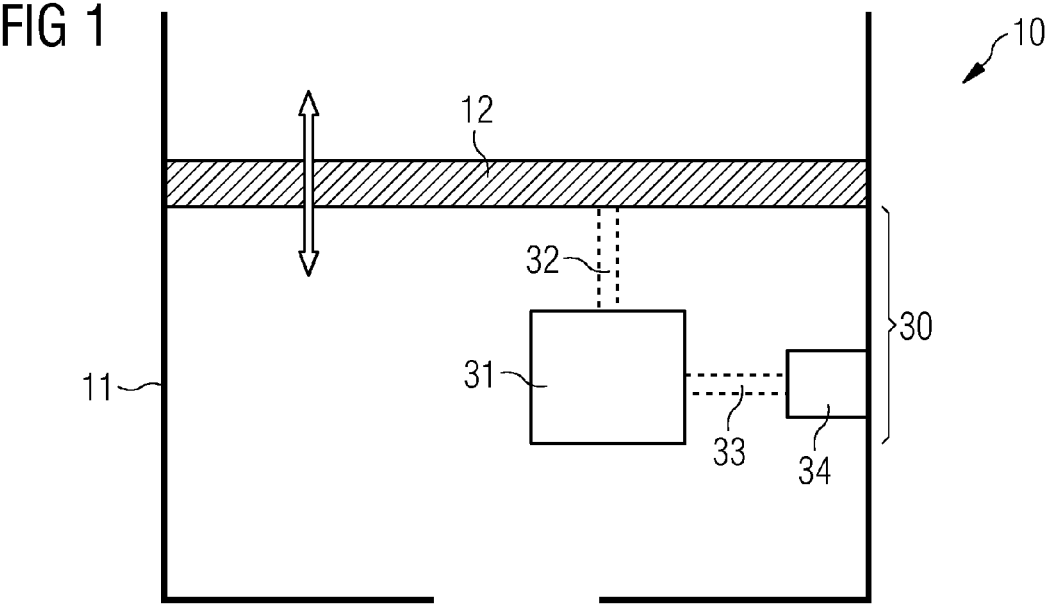
FIG. 1 is a schematic diagram showing an example subsea device comprising an example displacement sensor according to an embodiment of the invention.

Accordingly, there is a need for mitigating at least some of the drawbacks mentioned above, e.g., by providing a measurement of relatively large displacements with high accuracy.

According to an embodiment of the invention, a displacement sensor for sensing the displacement of a movable component of a device, preferably a subsea device, is provided. The displacement sensor comprises a displacement transmission mechanism adapted to reduce a larger displacement provided at its input into a smaller displacement at its output. It further comprises a fiber optic displacement sensor. The input of the displacement transmission mechanism is coupled to the movable component of the device, and its output is coupled to the fiber optic displacement sensor.

Since fiber optic displacement sensor is used, displacement measurements may be performed at a relatively high accuracy. Furthermore, by using the displacement transmission mechanism, relatively large displacements of the movable component of the device may become measurable. By using a fiber optic displacement sensor for measuring the reduced displacement, any electric or electronic components can be omitted, thus making the displacement sensor suitable for high pressure, dielectric liquid filled environments. Similarly, the use of a mechanism for converting a large displacement of the movable component into a small displacement to be measured by the fiber optic displacement sensor may enable the use of the displacement sensor arrangement in such difficult environments, in particular since the mechanism may only comprise mechanical components.

In an embodiment, the fiber optic displacement sensor may comprise one of a fiber Bragg grating sensor or an interferometric sensor. An interferometric sensor may for example be a fiber optic sensor employing white light polarization interferometry (WLPI). Fiber optic displacement sensor means that the sensor measures the displacement optically by means of light provided and/or detected through an optical fiber connected to the fiber optic displacement sensor. The optical fiber may, but does not need to comprise the component responsible for the optical displacement measurement, such as a fiber Bragg grating or the like.

The fiber optic displacement sensor may comprise a movable sensor tip having a certain displacement range, and the displacement of the movable sensor tip may be measured internally by the respective fiber optic measuring technique. As an example, in the case of the fiber grating sensor, the displacement sensor may comprise a transducer to convert the displacement of the movable sensor tip into a strain measurable by the fiber Bragg grating (FBG). Similarly, an interferometric technique may be used for measuring the displacement of the movable sensor tip. The output of the displacement transmission mechanism can be coupled to such movable sensor tip.

In an embodiment, the fiber optic displacement sensor may be mounted to an enclosure of the device, for example to an inner face of a wall of a pressure compensator forming part of the device. The fiber optic displacement sensor is thus stationary with respect to the enclosure of the device, relative to which the movable component may be moving.

In an embodiment, the displacement transmission mechanism comprises a gearbox. The displacement transmission mechanism may employ a gear reduction to reduce the displacement, i.e. to convert a larger displacement of the movable component into a smaller displacement measurable at the fiber optic displacement sensor. Such type of mechanism is relatively robust and can be employed in an environment of dielectric liquid at high pressure. Since it's relatively robust and almost maintenance free, it is particularly beneficial to employ such gearbox in a subsea device.

As an example, the displacement transmission mechanism may have a reduction ratio of at least 10 to 1, preferably at least 20 to 1 or even at least 30 to 1. Relatively large displacements of the movable component can thus be measured by a fiber optic displacement sensor having only a relatively small displacement range.

As an example, the fiber optic displacement sensor may be configured to have a maximum measurable displacement that lies within a range of about 0.5 to about 50 mm, preferably in a range of 1 to 40 mm, more preferably in a range of about 10 to about 30 mm. As an example, the fiber optic displacement sensor may have a maximum detectable displacement of about 25 mm.

The maximum displacement of the movable component that is to be measured may be at least 100 mm, preferably at least 250 mm, and more preferably at least 500 mm. The maximum displacement of the movable component of the device may for example lie within a range of about 250 to about 2.000 mm, preferably within a range of about 500 to about 1.500 mm. It should be clear that the reduction ratio of the displacement transmission mechanism may be chosen in accordance with the maximum displacement of the fiber optic displacement sensor and the maximum displacement of the movable component that is to be measured.

In an embodiment, the displacement transmission mechanism comprises a toothed rack. The toothed rack may for example be attached to the movable component of the device. The toothed rack may for example be attached to the movable component in such way that a movement of the movable component results in a corresponding movement of the toothed rack along its longitudinal direction. A gearbox may be provided which comprises a gear engaged with the toothed rack. Accordingly, the toothed rack and the gearbox may convert a relatively linear movement of the movable component into a rotation of a gear in the gearbox of the displacement transmission mechanism.

The displacement transmission mechanism may comprise a further toothed rack engaging a gear of the displacement transmission mechanism, in particular of the gearbox, and the toothed rack may be attached to the fiber optic displacement sensor. In particular in configurations in which a movable sensor tip of the fiber optic displacement sensor is to be moved linearly, a rotation of a gear of the gearbox can thus be converted into a linear movement and transmitted to the fiber optic displacement sensor.

The displacement transmission mechanism may furthermore comprise a support member for supporting the toothed rack, in particular the toothed rack coupled to the movable component, against the gearbox. The support member may for example be mounted to the housing of the device. The support member may extend in a substantially parallel direction away from the wall of the housing towards which they are mounted. The support member may comprise a roller, which is configured to role along a flat face of the toothed rack opposite the toothed face, so as to bring the toothed rack into firm engagement with a gear of the gearbox. Consequently, a bending of the toothed rack and slip between the gear of the gearbox and the toothed rack can be prevented. In particular in situations in which the toothed rack is mounted with its longitudinal direction perpendicular to the movable component, the toothed rack constitutes a considerable lever, so by pressing the toothed rack against the gear by means of the roller of the support member, a considerable stabilization of the system can be achieved.

Further, a support plate may be provided onto which the displacement transmission mechanism, e.g. the gearbox, and the fiber optic displacement sensors may be mounted. The support plate may extend substantially perpendicular to a wall of the enclosure of the subsea device. In other embodiments, the displacement transmission mechanism and the fiber optic displacement sensor may be directly mounted to a wall of the enclosure.

In an embodiment, the device is subsea device and comprises a pressure compensator having an internal volume. The movable component is movable to change the internal volume of the pressure compensator. By measuring the displacement of the movable component by means of the displacement sensor, the changes of the internal volume of the pressure compensator can thus be estimated.

The pressure compensator may comprise at least one bellow having a lid which forms the movable component and which is movable to change the internal volume of the bellow. The input of the displacement transmission mechanism may be connected to the lid. Accordingly, if the lid of the bellow moves, the fiber optic displacement sensor is actuated by means of the displacement transmission mechanism, thus making a deformation of the bellow measurable.

In another embodiment, the pressure compensator may comprise at least one cylinder, e.g. an elliptic or circular cylinder, having a lid which forms the movable component and which is movable to change the internal volume of the cylinder. Again, the input of the displacement transmission mechanism may be connected to the lid, thus enabling an estimation of the change of the cylinder's internal volume when the lid is moving.

In the above configurations, a toothed rack of a displacement transmission mechanism may be mounted to the lid and may extend in a direction perpendicular to the lid, preferably towards the internal volume of the pressure compensator. A compact design can thus be achieved. By using such configuration of the displacement conversion mechanism and in particular of the toothed rack, the displacement measured by the fiber optic displacement sensor may be proportional to changes of the internal volume of the pressure compensator, thus enabling the monitoring of the function of the pressure compensator.

In an embodiment, the device may be a subsea device, and the displacement sensor may be mounted inside a housing of the subsea device, preferably inside a pressure compensator forming part of the subsea device. The housing may be filled with a dielectric liquid and may be pressure balanced to an ambient pressure. The displacement sensor may for example be fully mounted inside the pressure compensator, thus achieving a compact design. Also, since the displacement sensor is arranged inside the dielectric liquid and the housing is pressure balanced, the subsea device including the displacement sensor can be deployed at considerable water depths, e.g. at depths in excess of 1.000, 2.000 or even 3.000 meters.

In particular, this may be achieved by providing only mechanical components in the gearbox, including components such as gearwheels, shafts, bearings, the above mentioned toothed racks or the like. Furthermore, the displacement sensor may be adapted to be suitable for operation in a dielectric environment at high ambient pressure, e.g. at pressures of at least 100, 200 or even 300 bar. This can be achieved making the use of the optical technique for displacement measurements.

A further embodiment of the invention provides a pressure compensator for subsea device comprising a displacement sensor according to any of the above outlined configurations. The movable component forms part of the pressure compensator and is movable to change the internal volume of the pressure compensator. The displacement sensor is adapted to detect changes of the internal volume of the pressure compensator by detecting a displacement of the movable component. A pressure compensator may thus be provided which can be monitored for volume changes, and the operability of which can be checked by a simple optical measurement.

In an embodiment, the movable component may be a lid of a bellow or cylinder of the pressure compensator, and the input of the displacement transmission mechanism may be mounted to the lid. As mentioned above, the input of the displacement transmission mechanism may be formed by a toothed rack attached to the lid.

According to a further embodiment of the invention, a method of sensing the displacement of a movable component of a device, in particular of a pressure compensator of a subsea device, is provided. The method comprises the steps of providing a displacement transmission mechanism adapted to reduce a larger displacement provided at its input into a smaller displacement at its output, wherein the input of the displacement transmission mechanism is coupled to the movable component of the device; providing a fiber optic displacement sensor, wherein the output of the displacement transmission mechanism is coupled to the fiber optic displacement sensor; reducing a larger displacement of the movable component of the device to a smaller displacement; and detecting the smaller displacement by means of the fiber optic displacement sensor.

By the inventive method, advantages similar to those outlined further above with respect to the displacement sensor may be achieved. The method may be performed by means of any of the above outlined configurations of the displacement sensor or pressure compensator. The method may furthermore comprise any of the steps described above with respect to the displacement sensor or pressure compensator.

In the following, embodiments of the invention will be described in detail with reference to the accompanying drawings. It is to be understood that the following description of the embodiments is given only for the purpose of illustration and is not to be taken in a limiting sense.

It should furthermore be noted that the drawings are to be regarded as being schematic representations only, and elements in the drawings are not necessarily to scale with each other. Rather, the presentation of the various elements is chosen such that their function in general purpose become apparent to a person skilled in the art.

FIG. 1 is a schematic drawing showing a subsea device 10, which may be or which may comprise a pressure compensator. The subsea device 10 has an enclosure 11 and a movable component 12. In the example of FIG. 1, the enclosure 11 has cylindrical shape, and the movable component 12 moves in axial direction of the cylindrical shape. Movable component 12 may thus correspond to a lid or piston which moves inside of the cylindrical enclosure 11.

The subsea device 10 is provided with a displacement sensor 30 according to an embodiment of the invention. The displacement sensor 30 comprises a displacement transmission mechanism 31 which has an input 32 and an output 33. The displacement transmission mechanism 31 converts a larger displacement at its input 32 into a smaller displacement at its output 33. The conversion ratio may for example be at least 10 to 1, i.e. an input displacement of at least 100 mm may correspond to an output displacement of 10 mm. In other embodiments, the conversion ratio may even be larger, for example at least 20 to 1, 30 to 1 or even at least 40 to 1. This way, a large displacement of the movable component 20 can be converted into a small displacement that is measurable with high accuracy.

For this purpose, a fiber optic displacement sensor 34 is provided which forms part of the displacement sensor 30. The fiber optic displacement sensor 34 uses an optical technique for measuring a displacement provided at its input, which is coupled to the output 33 of the displacement transmission mechanism 31. The fiber optic displacement sensor 34 may for example have a housing and a sensor tip, e.g. a stamp, that is movable into the housing and provides the input, the displacement of the stamp being internally measured by optical means.

As an example, the fiber optic displacement sensor 34 may be equipped with a fiber Bragg grating (FBG) which can be used for these placement measurements. The fiber optic displacement sensor 34 may be equipped with a transducer, which transduces a displacement provided at its input into a strain, the strain being applied to an optical fiber comprising the fiber Bragg grating. Examples of such transducers include a plate onto which the part of the optical fiber comprising one of more FBGs is firmly attached (e.g. by epoxy resin), wherein the sensor tip (e.g. the stamp) causes the plate to bend when being displaced, thus inducing strain in the fiber. The sensor tip (or stamp) may be spring loaded so that it will return into its original position upon displacement of the movable component in the reverse direction.

By interrogating the fiber Bragg grating by means of light supplied via an optical fiber (not shown in FIG. 1), the strain can be detected as a shift in the wavelength of the reflected (or transmitted) light. A further fiber Bragg grating may be provided for a temperature measurement, which may be interrogated by a different optical wavelength, so that a temperature independent strain measurement can be performed. The FBG for measuring temperature can be mechanically decoupled to avoid any strain, e.g. by means of a loop in the optical fiber. Accordingly, displacements provided at the input of fiber optic displacement sensor 34 can be determined with high accuracy.

Another possibility is the use of a fiber optic displacement sensor 34 employing an optical technique using interference. An example is the white light polarization interference (WLPI), for which the sensor 34 may be adapted. Such fiber optic displacement sensor may again comprise a transducer for transducing a linear position at its input (i.e. displacement) into a detectable optical signal. A birefringent wedge may be coupled to a transducer shaft which moves with the displacement at the sensor tip (or stamp). The birefringent wedge has a thickness varying along the translational direction. Light introduced by the optical fiber can now be reflected by a reflection polarizer onto the birefringent wedge, which will provide a different thickness in dependence on the position of the transducer shaft. The change in polarization of the light passing through the birefringent wedge depends on the wedge thickness and the wavelength of the light, resulting in different interference patterns.

Transducer position and thus displacement can be determined by locating the fringe peak or the envelope peak in a resulting interferogram. The displacement can thus be determined with high precision.

It should be clear that the above optical measurement techniques are only examples given for the purpose of illustration, and that the displacement sensor 30 may use other types of fiber optic displacement sensors 34.

In operation, a movement of the movable component 12 of, for example, 1.000 mm may be converted by means of the displacement transmission mechanism 31 into a displacement of mm, which is applied to the input of the fiber optic displacement sensor 34, which measures such displacement with high accuracy. Large displacements can thus be measured without requiring any electric components. Furthermore, since the displacement sensor 30 is based on mechanical and optical components, such as mechanical transducers and optical fibers and possibly other optical elements, it can be employed in a high pressure dielectric liquid environment. It is thus particularly suitable for subsea applications, it can for example be employed inside a pressure compensated enclosure of a subsea device.

Figure 2:
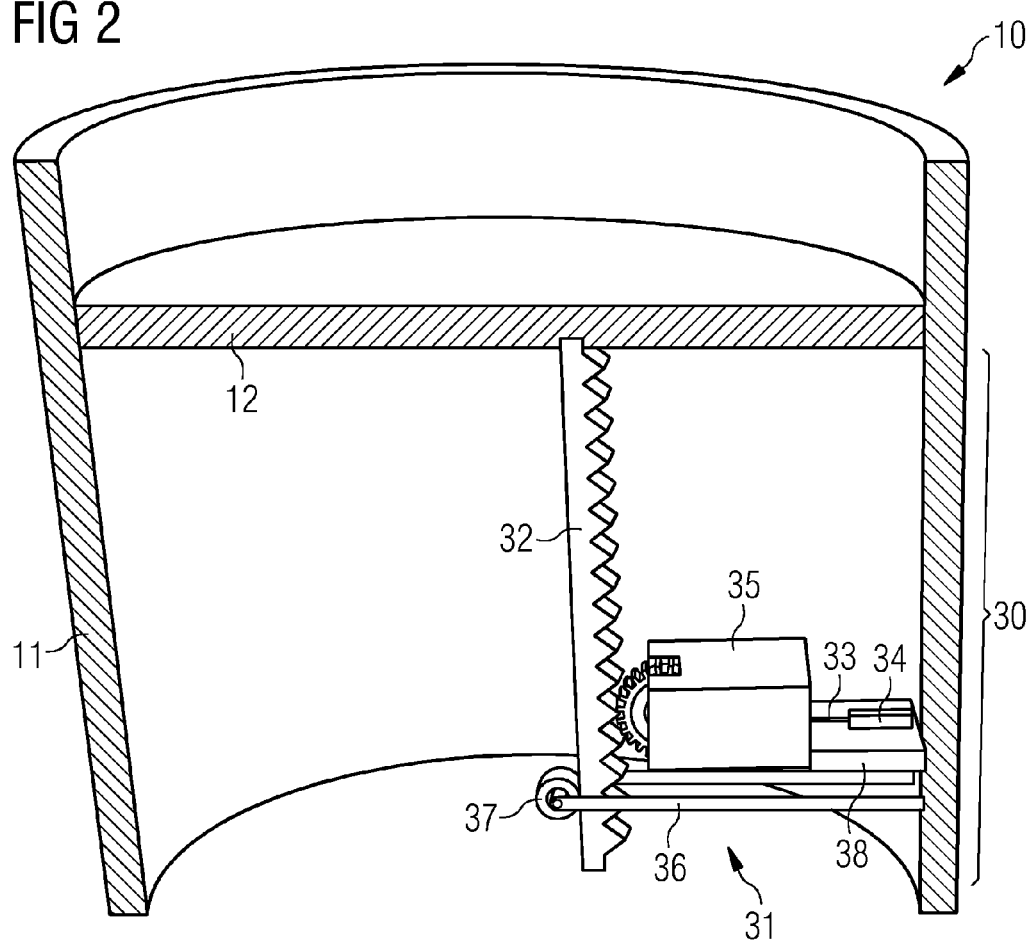
FIG. 2 is a schematic diagram showing an example subsea device in form of a pressure compensator according to an embodiment, wherein the subsea device comprises an example displacement sensor employing a toothed rack.

FIG. 2 is a schematic drawing showing a subsea device 10 comprising a particular embodiment of the displacement sensor 30. The fiber optic displacement sensor 34 can be configured as outlined above. The displacement transmission mechanism 31 comprises a toothed rack 32 (also termed flat gear) as an input, a gearbox 35 and a support member 36. The toothed rack 32 is attached to the movable component 12. In particular, it can be mounted perpendicular to a face of the movable component 12 in such way that a movement of the movable component 12 results in a movement of the toothed rack 32 in its longitudinal direction. The toothed rack 32 is in engagement with a gearwheel of the gearbox 35. To hold the toothed rack 32 in firm engagement with the gearwheel, a support member 36 is provided. The support member is mounted to the housing 11 of the subsea device 10 and comprises a roller 37 which is pressed against a flat face of the toothed rack 32, the face being opposite to the toothed face. The toothed rack 32 can thus freely move in longitudinal direction together with the movable component 12, while causing rotation of the gearwheel of the gearbox 35 without slip. By means of gear reduction, the gearbox 35 now transforms the large displacement of toothed rack 32 into a small displacement at its output 33.

In other embodiments, the toothed rack 32 may for example run in a track (forming a support member) along a wall of the housing 11, onto which the gearbox 35 is mounted, so that the inner volume of the subsea device 10 can remain unoccupied. It should be clear that the way in which the components of the displacement sensor 30 are arranged within the subsea device 10 will depend on the particular application and the available space.

In some embodiments, a second toothed rack may be provided at the output of the displacement transmission mechanism 31, which is attached to the input of the fiber optic displacement sensor 34. A slow rotation of a gearwheel of gearbox 35 can thus be transformed into a small displacement detectable by sensor 34. Other configurations are also conceivable, and a strain transducer may even be implemented directly in the output of the displacement transmission mechanism. This can for example be achieved by coupling the output of the displacement transmission mechanism 31 by means of a spring to the input of the sensor 34. In other configurations, a gearwheel which moves only within a limited angular range may directly be coupled to a deformable plate which carries an optical fiber comprising FBGs for measuring plate deformation. Other configurations are also conceivable.

As shown in the example of FIG. 2, the gearbox 35 and the fiber optic displacement sensor 34 may both be supported on a support plate 38, which is mounted to the housing 11 of subsea device 10.

The subsea devices 10 illustrated in FIGS. 1 and 2 may for example be a pressure compensator. As such, the device 10 may be mounted on another subsea device, e.g. to the enclosure of a subsea transformer, a subsea switchgear, a subsea variable speed drive or the like.

FIG. 3 shows a subsea device 10 comprising a pressure compensator 20 in accordance with an embodiment of the invention. Inside the pressure compensator 20, a displacement sensor 30 comprising the displacement transmission mechanism 31 with input 32 and output 33 and the fiber optic displacement sensor 34 is provided. The subsea device 10 has a movable component in form of the lid 22 of the pressure compensator 20. Pressure compensator 20 is implemented by a bellow comprising an enclosure in form of corrugated side walls 21 and the lid 22. The bellow is mounted onto the housing 11 the subsea device 10.

The housing 11 is filled with a dielectric liquid and is pressure compensated to the surrounding ambient pressure by means of the pressure compensator 20. This means that if the volume of the dielectric liquid inside the housing 11 changes, e.g. due to a temperature change or a pressure change, the volume change is taken up by pressure compensator 20, in particular by a movement of the lid 22. For this purpose, an opening 15 is provided between the interior of housing 11 and the interior of the pressure compensator 20, so that dielectric liquid can flow between the pressure compensator and the housing. Accordingly, no significant overpressure or underpressure compared to the ambient pressure can build up inside the housing 11.

The configuration of the displacement sensor 30 can be similar to the one illustrated in FIG. 1 or 2, so the explanations given further above apply correspondingly to the displacement sensor 30 of FIG. 3. The input 32 of the displacement transmission mechanism 31 is attached to the lid 22 of the pressure compensator 20. The output 33 of the displacement transmission mechanism 31 is attached to the fiber optic displacement sensor 34.

The lid 22 of pressure compensator 20 may for example have a maximum allowable movement of about one meter. Displacement transmission mechanism 30 may reduce this maximum movement to a maximum displacement of about 25 mm at its output. A displacement of at maximum 25 mm may be detected by the fiber optic displacement sensor 34, e.g. with a resolution of about 0.001 mm. The displacement transmission mechanism 30 may thus have a reduction ratio of about 40 to 1. The total resolution of the displacement measurement of the lid 22 can thus be about 0.04 mm.

A measuring unit 40 located in the subsea device 10 may further be provided and may be part of the displacement sensor 30. The measuring unit 40 comprises an optical fiber connection to the fiber optic displacement sensor 34. Measuring unit 40 may for example include a light source for providing white light or light of a particular wavelength to an optical displacement measurement arrangement within the fiber optic displacement sensor 34. As an example, white light may be provided which is reflected towards and passes the above mentioned birefringent wedge, and the reflected light may be detected and processed within measuring unit 40.

In another configuration, a light source within measuring unit may supply light of different wavelengths via the fiber optic connection to the fiber optic displacement sensor 34 for interrogating one or more fiber Bragg gratings disposed therein. Again, the light reflected by or transmitted through the fiber Bragg gratings can be transmitted via the fiber optic connection to the measuring unit 40, where it is detected and analyzed. Measuring unit 40 may for example employ spectroscopic measuring techniques for determining the wavelengths of the light received from the fiber optic displacement sensor 34. Measuring unit 40 may furthermore evaluate the detected signal, e.g. for determining the position of the movable component 22 of pressure compensator 20, or for determining whether pressure compensator 20 operates according to specifications. Measuring unit 40 may communicate such evaluation results to a topside installation, or it may communicate the measured signal to a topside installation for being evaluated. It may also store such information internally, e.g. in form of a error code or the like.

Note that although a pressure compensator 20 in form of a bellow is illustrated in FIG. 3, it should be clear that the teachings are not restricted to such type of pressure compensator, but different types of pressure compensators may be used (e.g. a double bellow compensator, a piston type compensator, a membrane type compensator or the like). Also, it should be clear that the above described displacement sensor 30 may be used for measuring displacement in devices other than pressure compensators. The above described displacement sensor has the particular benefit that it can be used under harsh conditions, such in a pressure compensated enclosure of a subsea device. Large displacements of a movable component can continuously be measured with high resolution. The implementation by means of the displacement transmission mechanism is comparatively simple and robust. Furthermore, the employment of a fiber optic sensing technique makes any electronics within the displacement sensor 30 obsolete, the displacement sensor thus being essentially immune to electromagnetic interference, radio frequency interference (RFI) and the like.

Features of the above outlined embodiments can be combined with each other. The skilled person will appreciate that the above described embodiments are only examples given for the purpose of illustration, and that modifications may be made without departing from the scope of the invention.

What is claimed is:

1. A displacement sensor system for sensing a displacement of a movable component of a device, the displacement sensor system comprising:
   a displacement transmission mechanism having an input and an output and configured to reduce a displacement provided at its input into a smaller displacement at its output, wherein the displacement transmission mechanism comprises at least one of (a) a gearbox configured to provide a gear reduction to reduce the displacement and (b) a toothed rack, and wherein the input of the displacement transmission mechanism is coupled to the movable component of the device, and a fiber optic displacement sensor, wherein the output of the displacement transmission mechanism is coupled to the fiber optic displacement sensor.

2. The displacement sensor system according to claim 1, wherein the fiber optic displacement sensor comprises a fibre Bragg grating sensor or an interferometric sensor.

3. The displacement sensor system according to claim 1, wherein the fiber optic displacement sensor is mounted to an inner face of a wall of a pressure compensator forming part of the device.

4. The displacement sensor system according to claim 1, wherein:

the displacement transmission mechanism comprises both the gearbox and the toothed rack, the toothed rack is coupled to the movable component of the device, and the gearbox comprises a gearwheel engaged with the toothed rack.

5. The displacement sensor system according to claim 1, wherein the displacement transmission mechanism comprises the toothed rack, and wherein the toothed rack engages a gear of the displacement transmission mechanism and which is coupled to the fiber optic displacement sensor.

6. The displacement sensor system according to claim 1, wherein the device is a subsea device and comprises a pressure compensator having an internal volume, the movable component being movable to change an internal volume of the pressure compensator.

7. The displacement sensor system according to claim 6, wherein the pressure compensator comprises at least one bellow having a lid which forms the movable component and which is movable to change the internal volume of the bellow, wherein the input of the displacement transmission mechanism is mounted to the lid.

8. The displacement sensor system according to claim 7, wherein the displacement transmission mechanism comprises the toothed rack, wherein the toothed rack is mounted to the lid and extends perpendicular to the lid, and wherein the input of the displacement transmission mechanism comprises the toothed rack mounted to the lid.

9. The displacement sensor system according to claim 6, wherein the pressure compensator comprises at least one cylinder having a lid which forms the movable component and which is movable to change the internal volume of the cylinder, wherein the input of the displacement transmission mechanism is mounted to the lid.

10. The displacement sensor system according to claim 1, wherein the device is a subsea device and the displacement sensor system is mounted inside a pressure compensator forming part of the subsea device, and wherein the housing is filled with a dielectric liquid and is pressure balanced to an ambient pressure.

11. A pressure compensator for a subsea device, the pressure compensator comprising:

a displacement sensor system for sensing a displacement of a movable component of the subsea device, comprising:

a displacement transmission mechanism having an input and an output and configured to reduce a displacement provided at its input into a smaller displacement at its output, wherein the displacement transmission mechanism comprises at least one of (a) a gearbox configured to provide a gear reduction to reduce the displacement and (b) a toothed rack, and wherein the input of the displacement transmission mechanism is coupled to the movable component of the device, and a fiber optic displacement sensor, wherein the output of the displacement transmission mechanism is coupled to the fiber optic displacement sensor, wherein the movable component forms part of the pressure compensator and is movable to change an internal volume of the pressure compensator, and wherein the displacement sensor system is configured to detect changes of the internal volume of the pressure compensator by detecting a displacement of the movable component.

12. The pressure compensator according to claim 11, wherein the movable component is a lid of a bellow or cylinder of the pressure compensator, the input of the displacement transmission mechanism being mounted to the lid.

13. The pressure compensator according to claim 12, wherein the displacement transmission mechanism comprises the toothed rack, wherein the toothed rack is mounted to the movable lid of the bellow or cylinder of the pressure compensator, and wherein the input of the displacement transmission mechanism comprises the toothed rack mounted to the movable lid.

14. The pressure compensator according to claim 11, wherein the fiber optic displacement sensor comprises a fibre Bragg grating sensor or an interferometric sensor.

15. The pressure compensator according to claim 11, wherein the fiber optic displacement sensor is mounted to an inner face of a wall of a pressure compensator forming part of the device.

16. The pressure compensator according to claim 11, wherein:

the displacement transmission mechanism comprises both the gearbox and the toothed rack, the toothed rack is coupled to the movable component of the device, and the gearbox comprises a gearwheel engaged with the toothed rack.

17. The pressure compensator according to claim 11, wherein the displacement transmission mechanism comprises the toothed rack, and wherein the toothed rack engages a gear of the displacement transmission mechanism and which is coupled to the fiber optic displacement sensor.

18. The pressure compensator according to claim 11, comprising at least one bellow having a lid which forms the movable component and which is movable to change the internal volume of the bellow, wherein the input of the displacement transmission mechanism is mounted to the lid.

19. A method of sensing the displacement of a movable component of a pressure compensator of a subsea device, the method comprising:

providing a displacement transmission mechanism having an input and an output and configured to reduce a displacement provided at its input into a smaller displacement at its output, wherein the displacement transmission mechanism comprises at least one of (a) a gearbox configured to provide a gear reduction to reduce the displacement and (b) a toothed rack, and wherein the input of the displacement transmission mechanism is coupled to the movable component of the device, providing a fiber optic displacement sensor, wherein the output of the displacement transmission mechanism is coupled to the fiber optic displacement sensor, reducing a displacement of the movable component of the device to a smaller displacement, detecting the smaller displacement using the fiber optic displacement sensor.

* * * * *